12; UNITED STATES PATENT OFFICE.

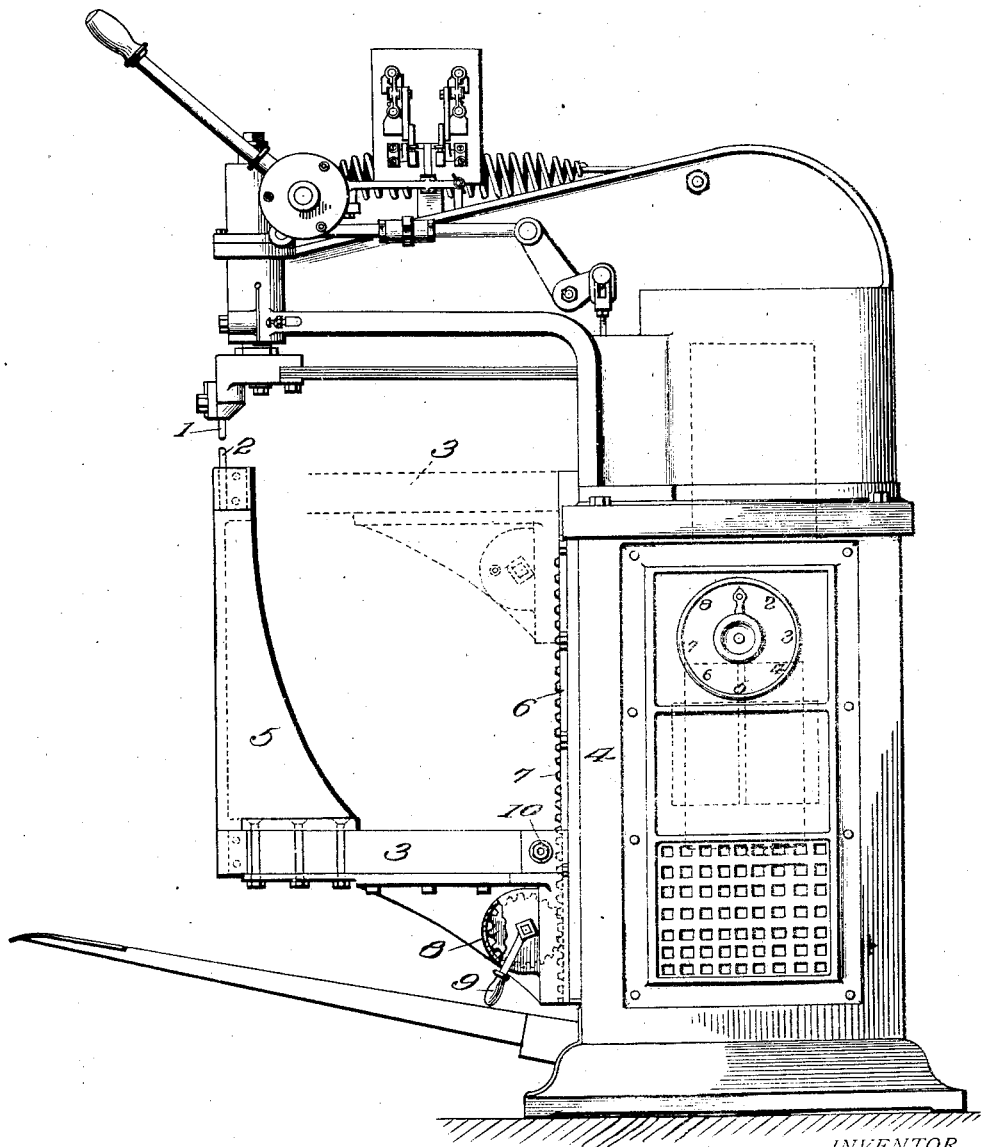

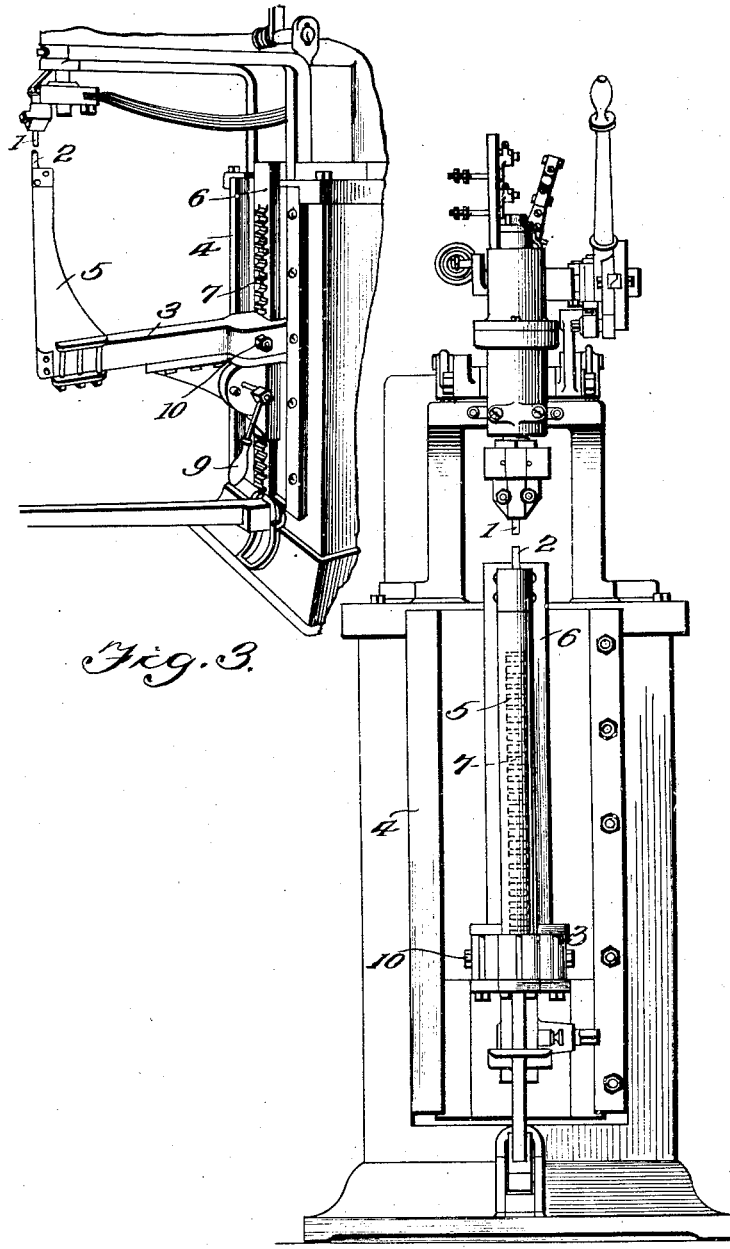

FREDERICK P. McBERTY, OF WARREN, OHIO, ASSIGNOR TO THE NATIONAL ELECTRIC WELDER COMPANY, OF WARREN, OHIO, A CORPORATION OF OHIO.

ELECTRIC SPOT-WELDING MACHINE.

1,098,632.  Specification of Letters Patent. Patented June 2, 1914.

Application filed September 30, 1912. Serial No. 723,192.

*To all whom it may concern:*

Be it known that I, FREDERICK P. MC-BERTY, of Warren, in the county of Trumbull and State of Ohio, have invented certain new and useful Improvements in Electric Spot-Welding Machines; and I do hereby declare the following to be a full, clear, and exact description of the invention, such as will enable others skilled in the art to which it appertains to make and use the same.

The primary object of this invention is to extend the range of efficiency of spot welding machines, that is to say, to enable them to handle all classes of work including boxes or vessels of greater or less depth.

In the accompanying drawing, Figure 1 is a side elevation, parts being indicated in dotted lines. Fig. 2 is a front elevation. Fig. 3 is a view in perspective with parts broken away.

Referring to the drawings, 1 designates the upper electrode, and 2 the lower electrode, the former being relatively fixed while the latter, according to one phase of my invention, is relatively adjustable longitudinally of its axis. The supporting arm 3 of the lower electrode extends horizontally from the machine frame 4, and is always parallel with the support of the upper electrode. It is capable of being adjusted in a vertical plane and held at any desired point.

The electrode 2 is mounted on the upper end of a vertically-disposed horn or extension 5 detachably secured to arm 3. The horn may be of any desired length, depending upon the depth of the article to be welded, and hence a series of horns differing in length may be provided. The construction of the means for adjusting the horn-supporting arm may be widely varied, but it is essential that this arm, which is composed of heavy copper, always be in proper engagement with the respective electric terminal of the machine. I have shown this terminal as composed of a copper plate 6 centrally of which is a vertically-arranged rack bar 7 with which meshes a gear wheel 8 mounted in the inner end of the horn supporting arm. The shaft of this wheel is designed to be engaged by handle 9 by which it may be readily turned to raise or lower the supporting arm when binding bolt 10 is loosened. The extent to which the arm is raised or lowered depends upon the length of the horn or extension, which latter is preferably controlled by the character of the work, that is to say, the depth of the vessel.

The advantages of my invention will be readily appreciated by those skilled in the art.

I claim as my invention:

A spot welding machine having a relatively fixed electrode, a horizontally disposed arm, a vertically disposed horn carried by said arm, a second electrode mounted on said horn, and means for moving said arm in a vertical plane.

In testimony whereof, I have signed this specification in the presence of two subscribing witnesses.

FREDERICK P. McBERTY.

Witnesses:
R. H. SNYDER,
J. M. GILLEN.